(12) United States Patent
Saggi et al.

(10) Patent No.: US 12,706,120 B2
(45) **Date of Patent: *Aug. 11, 2026**

(54) AUTOMATIC VIDEO FORMATTING WITH BRAND AWARENESS

(71) Applicant: SalesTing, Inc., Atlanta, GA (US)

(72) Inventors: Piyush Saggi, Atlanta, GA (US); Nitesh Chhajwani, Atlanta, GA (US); Thomas Ploetz, Atlanta, GA (US)

(73) Assignee: SalesTing, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/938,971

(22) Filed: Nov. 6, 2024

(65) Prior Publication Data

US 2025/0061923 A1 Feb. 20, 2025

Related U.S. Application Data

(63) Continuation of application No. 17/967,414, filed on Oct. 17, 2022, now Pat. No. 12,142,299.

(51) Int. Cl.

| | |
|---|---|
| ***G11B 27/036*** | (2006.01) |
| ***G06V 10/44*** | (2022.01) |
| ***G06V 20/40*** | (2022.01) |
| ***G06V 40/16*** | (2022.01) |

(52) U.S. Cl.

CPC ............ *G11B 27/036* (2013.01); *G06V 10/44* (2022.01); *G06V 20/46* (2022.01); *G06V 40/161* (2022.01)

(58) Field of Classification Search

CPC .... G11B 27/036; G06V 20/46; G06V 40/161; G06V 10/44

See application file for complete search history.

(56) References Cited

U.S. PATENT DOCUMENTS

| | | | | |
|---|---|---|---|---|
| 10,679,383 | B2 | 6/2020 | Pennig et al. | |
| 10,755,030 | B2 | 8/2020 | Hamlin et al. | |
| 11,265,181 | B1 | 3/2022 | Springer | |
| 12,142,299 | B2 * | 11/2024 | Saggi .................. | G06V 40/161 |
| 2018/0181549 | A1 | 6/2018 | Hileman et al. | |
| 2024/0127862 | A1 | 4/2024 | Saggi et al. | |

* cited by examiner

*Primary Examiner* — Girumsew Wendmagegn

(74) *Attorney, Agent, or Firm* — Neo IP

(57) ABSTRACT

The present invention includes a system for improving the visual quality of recorded videos, especially screen recordings such as webinars. The system automatically detects the boundaries of individual tile elements on a screen recording, and then performs facial recognition in order to identify which tiles include a human face and for tracking that face even when the tiles are repositioned over the course of the video. The system uses liveness detection to determine which tiles are video tiles and which tiles are screenshare tiles and then automatically shifts the relative position of the video tiles and the screenshare tiles to create an improved aesthetic quality of the recorded videos. The system is further capable of automatically integrating a company's color branding or logos into the recorded videos.

20 Claims, 4 Drawing Sheets

AUTOMATIC VIDEO FORMATTING WITH BRAND AWARENESS

CROSS REFERENCES TO RELATED APPLICATIONS

This application is related to and claims priority from the following U.S. patents and patent applications. This application is a continuation of U.S. patent application Ser. No. 17/967,414, filed Oct. 17, 2022, which is incorporated herein by reference in its entirety.

BACKGROUND OF THE INVENTION

1. Field of the Invention

The present invention relates to systems and methods for automatically formatting and editing video content, and more specifically to incorporating brand features into presentation of video content.

2. Description of the Prior Art

It is generally known in the prior art to utilize user-selected color palettes to automatically modify user-developed graphical user interfaces (GUI), such as with software provided by SALESFORCE.COM. Similar methods for automatically maintaining color theme consistency in a slide presentation have also been developed.

Prior art patent documents include the following:

U.S. Pat. No. 11,265,181 for Multi-point video presentations with live annotation by inventor Springer, filed Jan. 30, 2021 and issued Mar. 1, 2022, discloses methods, systems, and apparatuses, including computer programs encoded on computer storage media relate to a method for providing multi-point video presentations with live annotations within a communication platform. First, the system receives video feeds depicting imagery of a number of users. The system then determines a boundary about each user in the video feeds, with the boundaries each having an interior portion and an exterior portion. The system provides a media background for the exterior portions, then generates a composite video for each of the feeds. The system then determines that one or more client devices have annotation permissions, and receives one or more annotation inputs corresponding to at least one of the composite videos. Finally, the system updates at least one of the composite videos to additionally depict the annotation inputs within a third layer.

U.S. Pat. No. 10,679,383 for Interface color branding by inventors Pennig et al., filed Nov. 3, 2017 and issued Jun. 9, 2020, discloses a system, method, and computer program product providing interface color branding. An embodiment operates by receiving a primary color associated with a theme of a user interface. A first color code corresponding to the primary color is determined. The first color code is converted into a second color code corresponding to the primary color, wherein the first color code is in a device-dependent color format and the second color code is in a device-independent color format. A secondary color corresponding to each of one or more portions of the user interface is derived from the second color code. Each secondary color is converted from the device-independent color format into the device-dependent color format. The one or more portions of the user interface are colored in the device-dependent color format.

U.S. Pat. No. 10,755,030 for Color theme maintenance for presentations by inventors Hamlin et al., filed Jun. 29, 2017 and issued Aug. 25, 2020, discloses a system, method, and computer program product providing color theme maintenance for presentations. An embodiment operates by receiving a border image, a background color rule, a text color rule, and compiling the rules into a theme for a presentation. The compiled theme is provided to an application configured to display the presentation including the compiled theme in accordance with the background color rule and the text color rule.

US Patent Publication No. 2018/0181549 for Automatically formatting content items for presentation by inventors Hileman et al., filed Mar. 22, 2017 and published Jun. 28, 2018, discloses systems, methods, and non-transitory computer-readable storage media for automatically formatting content items for presentation. For example, in response to receiving an invocation of a presentation mode for a content item, a computing device can generate a tree structure representing the structure of the content item. The computing device can generate a presentation version of the content item based on a presentation template that defines the presentation formatting for the content item. The computing device can traverse the tree and determine a portion of the presentation version of the content item to present based on the amount of content that can fit within a display size of a display device. In some implementations, the computing device can determine portions of content to suppress and/or highlight based on various characteristics, metadata, comments, links, etc., corresponding to the portions of content in the content item.

SUMMARY OF THE INVENTION

The present invention relates to systems and methods for automatically formatting and editing video content, and more specifically to incorporating brand features into presentation of video content.

It is an object of this invention to improve the aesthetic quality and brand integration of uploaded video content.

In one embodiment, the present invention is directed to a system for improving the visual quality of screen recordings, including a server platform, including a processor and a memory, wherein the server platform receives at least one screen recording, wherein the server platform performs edge detection to automatically identify at least one tile constituting the at least one screen recording, wherein the server platform implements facial recognition to identify one or more of the at least one tile including a human face, wherein the server platform automatically tracks movement of each tile including each identified face over the length of the at least one screen recording, wherein the server platform performs liveness detection to determine if each of the at least one tile is a video tile or a screenshare tile, and wherein the server platform automatically reconfigures relative locations of each tile for one or more time points in the at least one screen recording based on whether each tile is a video tile or a screenshare tile.

In another embodiment, the present invention is directed to a method for improving the visual quality of screen recordings, including a server platform receiving at least one screen recording, the server platform performing edge detection and automatically identifying at least one tile constituting the at least one screen recording, the server platform implementing facial recognition and identifying one or more of the at least one tile including a human face, the server platform automatically tracking movement of each tile including each identified face over the length of the at least one screen recording, the server platform performing liveness detection to determine if each of the at least one tile is a video tile or a screenshare tile, and the server platform automatically reconfiguring relative locations of each tile for one or more time points in the at least one screen recording based on whether each tile is a video tile or a screenshare tile.

In yet another embodiment, the present invention is directed to a system for improving the visual quality of screen recordings, including a server platform, including a processor and a memory, wherein the server platform receives at least one screen recording, wherein the server platform performs edge detection to automatically identify at least one tile constituting the at least one screen recording, wherein the server platform implements facial recognition to identify one or more of the at least one tile including a human face, wherein the server platform performs liveness detection to determine if each of the at least one tile is a video tile or a screenshare tile, wherein the server platform automatically reconfigures relative locations of each tile for one or more time points in the at least one screen recording based on whether each tile is a video tile or a screenshare tile, wherein the server platform receives information regarding at least one company and/or at least one individual associated with each screen recording, and wherein the server platform utilizes a web crawler to automatically retrieve brand information for the at least one associated company and/or the at least one associated individual, and herein the server platform automatically recolors at least one section of the at least one screen recording based on the brand information of the at least one associated company and/or the at least one associated individual.

These and other aspects of the present invention will become apparent to those skilled in the art after a reading of the following description of the preferred embodiment when considered with the drawings, as they support the claimed invention.

DETAILED DESCRIPTION

Figure 1:
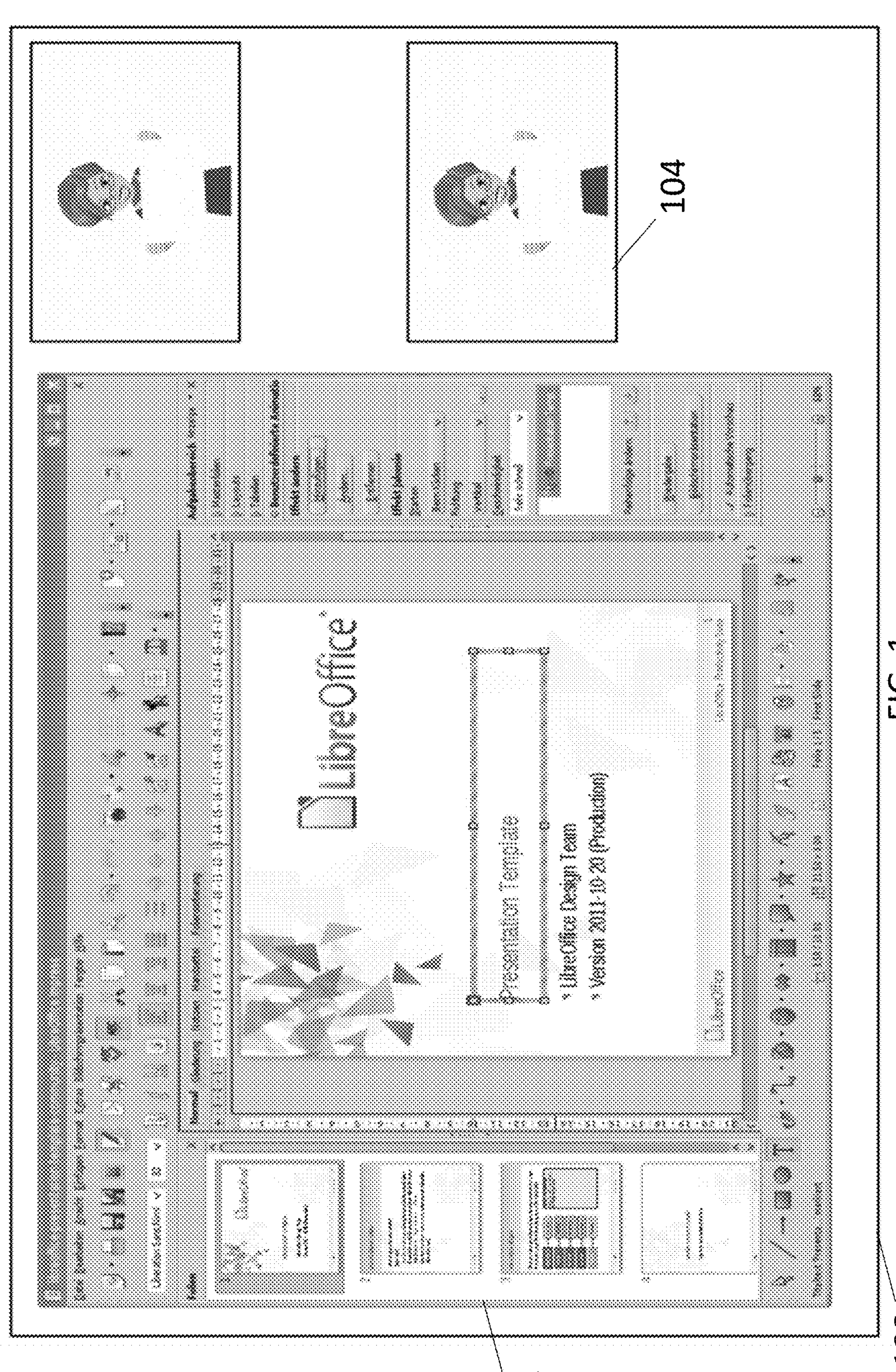
FIG. 1 illustrates a recorded video able to be edited according to one embodiment of the present invention.

The present invention is generally directed to systems and methods for automatically formatting and editing video content, and more specifically to incorporating brand features into presentation of video content.

In one embodiment, the present invention is directed to a system for improving the visual quality of screen recordings, including a server platform, including a processor and a memory, wherein the server platform receives at least one screen recording, wherein the server platform performs edge detection to automatically identify at least one tile constituting the at least one screen recording, wherein the server platform implements facial recognition to identify one or more of the at least one tile including a human face, wherein the server platform automatically tracks movement of each tile including each identified face over the length of the at least one screen recording, wherein the server platform performs liveness detection to determine if each of the at least one tile is a video tile or a screenshare tile, and wherein the server platform automatically reconfigures relative locations of each tile for one or more time points in the at least one screen recording based on whether each tile is a video tile or a screenshare tile.

In another embodiment, the present invention is directed to a method for improving the visual quality of screen recordings, including a server platform receiving at least one screen recording, the server platform performing edge detection and automatically identifying at least one tile constituting the at least one screen recording, the server platform implementing facial recognition and identifying one or more of the at least one tile including a human face, the server platform automatically tracking movement of each tile including each identified face over the length of the at least one screen recording, the server platform performing liveness detection to determine if each of the at least one tile is a video tile or a screenshare tile, and the server platform automatically reconfiguring relative locations of each tile for one or more time points in the at least one screen recording based on whether each tile is a video tile or a screenshare tile.

In yet another embodiment, the present invention is directed to a system for improving the visual quality of screen recordings, including a server platform, including a processor and a memory, wherein the server platform receives at least one screen recording, wherein the server platform performs edge detection to automatically identify at least one tile constituting the at least one screen recording, wherein the server platform implements facial recognition to identify one or more of the at least one tile including a human face, wherein the server platform performs liveness detection to determine if each of the at least one tile is a video tile or a screenshare tile, wherein the server platform automatically reconfigures relative locations of each tile for one or more time points in the at least one screen recording based on whether each tile is a video tile or a screenshare tile, wherein the server platform receives information regarding at least one company and/or at least one individual associated with each screen recording, and wherein the server platform utilizes a web crawler to automatically retrieve brand information for the at least one associated company and/or the at least one associated individual, and herein the server platform automatically recolors at least one section of the at least one screen recording based on the brand information of the at least one associated company and/or the at least one associated individual.

Webinars are a common way for learning to take place in the present day, with the market for online learning continuing to grow. Webinars are recorded for a variety of purposes, including for primary and secondary education, professional workshops, corporate information sessions, advertisements, and even film. For many educational institutions and corporations, large amounts of webinars are produced, often on a daily basis. While many attendees are willing to accept live webinars having a certain format (e.g., video tiles and screenshare in a specific orientation), as these webinars allow for live responses and other benefits that often outweigh perceived visual imperfections in the webinar, such acceptance often does not extend to recorded video. The extremely large abundance of recorded video content on the Internet means that videos often need refined visual formats in order to retain audience interest and attention. However, many of these educational institutions and corporations do not possess the time, money, or personnel to manually edit the videos to make the webinars more acceptable for later viewing.

Prior art methods provide methods for editing video content, even including live video content, and other web content. For example, U.S. Pat. No. 11,265,181, assigned to ZOOM, provides for live video annotation and even enhancement of specific video tiles for emphasis. While the '181 discusses identifying an interior portion and exterior portion of separate video tiles, it does not provide any information on liveness detection, meaning that it cannot identify the difference between screenshare tiles including static images of a human face and a live video tile (without having direct information regarding which video tiles are live video and which are not). Additionally, systems and methods of improving web content with color branding and other brand information is known in the prior art and shown in patents assigned to SALESFORCE.COM, such as U.S. Pat. Nos. 10, 679,383 and 10,755,030. However, none of the prior art provides a method of automatically recognizing video tiles of a recorded webinar and separating the video tiles from screenshare for improving the visual quality of the recorded webinar.

Referring now to the drawings in general, the illustrations are for the purpose of describing one or more preferred embodiments of the invention and are not intended to limit the invention thereto.

The system and method according to the present invention utilizes a processor and memory capable of receiving video files, including, but not limited to, MP4, MOV, WMV, FLV, AVI, AVCHD, WebM, MKV, OGV, and any other video file format. The processor is capable of editing the received video files to produce new video files having improved visual appearance. The system of the present invention is particularly useful as a tool in creating "snackified," or shortened condensed versions of previously recorded videos, often focused on a particular subject within a larger recorded video.

FIG. 1 illustrates a recorded video able to be edited according to one embodiment of the present invention. A captured screen video 100 commonly includes a screenshare tile 102 as well as one or more live video tiles 104. Typically, a screenshare tile 102 is a largely static tile, such as a slide including text information or static images. However, these static images often contain images of individuals (e.g., historical photographs, stock photos, etc.). Therefore, simple facial analysis of each tile is unable to determine which tiles have video and which tiles are the screenshare.

It is worth noting that while the format shown in FIG. 1 shows the video tiles 104 to the right of the screenshare tile 102, this often varies significantly between different video chat programs (e.g., ZOOM, G-CHAT, SKYPE, etc.). Furthermore, video tiles 104 are not always separated from the screenshare tile 102 and are sometimes directly overlaid on top of the screenshare tiles 102. However, the system according to the present invention is able to automatically segment the tiles of a webinar and improve the appearance of the webinar, regardless of the format of the webinar.

Figure 2:
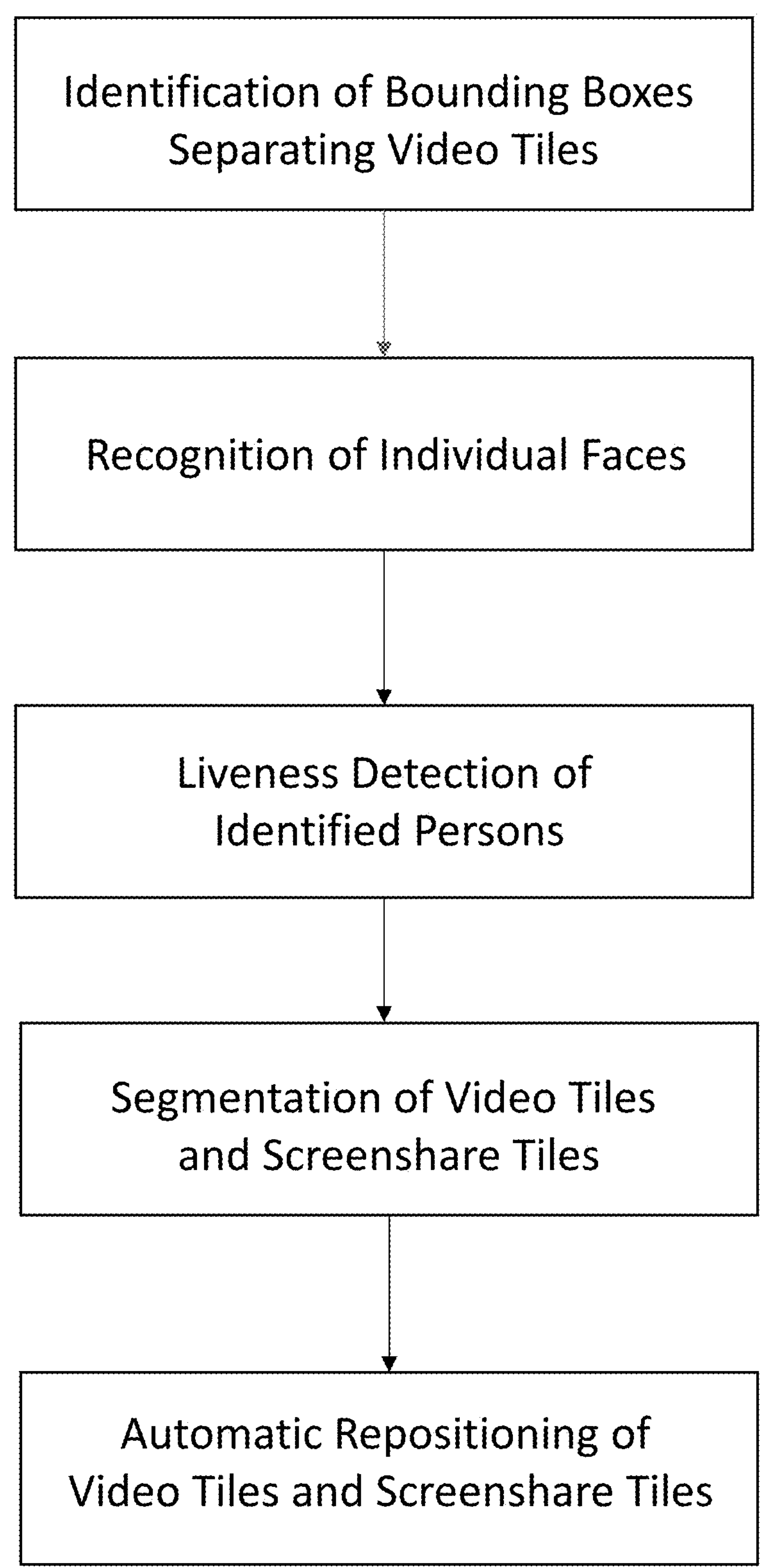
FIG. 2 is a flow diagram of a process of segmenting video tiles according to one embodiment of the present invention.

FIG. 2 is a flow diagram of a process of segmenting video tiles according to one embodiment of the present invention. In one embodiment, the system automatically identifies bounding boxes surrounding video tiles (including live video tiles and screenshare tiles). In one embodiment, bounding boxes are automatically identified by the system as sharp geometric lines forming a closed polygon or rounded two-dimensional shape. In one embodiment, bounding boxes are identified, in part, based on relative change in pixels on the screen. For example, if all or a large percentage of pixels within a first box move at the same time and this differs from the time in which pixels in a second, smaller box overlaid on the first box move, then the second, smaller box is recognized as a separate tile from the large box. The term "bounding box" as used herein does not require that the boundaries of each tile are squares or rectangles. In one embodiment, bounding boxes include other shapes, such as circles, hexagon, octagons, pentagons, ovals, triangles, rhombuses, trapezoids, and/or any other closed, non-self-intersecting polygon.

After identifying each separate tile, the system automatically determines which tiles include a human face. Systems and methods for facial recognition known in the prior art are able to be used with the present invention and include, but are not limited to, U.S. Pat. Nos. 9,275,269 and 8,457,367 and U.S. Patent Publication No. 2016/0070952, each of which is incorporated herein by reference in its entirety. By identifying tiles with faces, the system is able to determine which tiles are candidates for, though not definitely acting as, live video tiles of individuals. In instances in which individuals do not have their video camera on, and instead have it replaced by a text box or an avatar, the system is easily able to identify these tiles as separate tiles based on the image remaining entirely static for the entire duration of the video. In one embodiment, tiles that display no movement at all or substantially minimal movement for the entire duration of the received video are automatically identified as individual tiles without video enabled. Conveniently, in videos with large numbers of participants, the system frequently does not need to identify tiles without video enabled, as video chat services commonly only show those participants with video enabled on screen at any one time.

In one embodiment, the system utilizes a Hough transform on received recorded videos to perform edge detection so as to identify straight lines and other simply geometric features (e.g., circles) that commonly constitute boundaries of tiles. The use of Hough transforms to perform edge detection is discussed in prior art documents, such as U.S. Pat. Nos. 9,972,093 and 8,170,340, each of which is incorporated herein by reference in its entirety.

In one embodiment, facial recognition is used not only to detect the presence of any human face in a video, but also to identify which faces are appearing in a video over time. This is useful, as it allows the system to track the locations of specific tiles over time based on the presence of specific faces. In some video chat systems, over the course of a webinar, the chat system will automatically reposition tiles over time (e.g., rearranging the order of video tiles based on who spoke most recently, repositioning the video tiles on the screen when a screenshare begins, etc.). By using facial recognition to track the identify of specific tiles, even when those tiles move in the webinar, the system is able to keep those tiles in a fixed position for the entire video, or otherwise rearrange the tiles as needed to provide for improved aesthetics. Notably, this allows the system to apply a consistent formatting to video files received from different platforms (e.g., videos from ZOOM, GOOGLE MEET, SKYPE, or other platforms with all feature video tiles on the bottom with a screenshare tile above). In one embodiment, the tracking of each tile is not solely based on facial recognition of at least one face in each tile, but also based on additional factors, such as computer-generated backgrounds in each tile, average frame rate of each time, and/or other factors. In one embodiment, temporal filtering is used to filter out false facial recognition determination. Without temporal filtering (e.g., using simple frame-byframe detection), there is more likely to be miscategorization of faces based on outliers in individuals frames, so the temporal filtering remedies this issue. In one embodiment, smoothing over fuzzy constraints is used in geometric matching of the facial recognition in order to account for and filter out noise in establishing face localization.

In one embodiment, the system automatically positions a screenshare tile above, below, or beside one or more video tiles. In one embodiment, each video tile is automatically positioned on a single side of the screenshare tile. In another embodiment, the video tiles are placed around the screenshare tile. In order to assign a position of the screenshare tile relative to the video tiles, the system first confirms which tiles are screenshare tiles and which tiles are video tiles. The system uses liveness detection to determine which tiles are screenshare tiles and which tiles are video tiles. Liveness detection includes calculating whether changes in pixels of a tile over a period of time exceed a preset threshold. If the changes exceed the preset threshold, then the tile is determined to be a video tile. If the changes do not exceed the preset threshold, then the tile is determined to be a screenshare tile. If the system determines that all tiles exceed the preset threshold, then the system detects that, during that period of time, the chat is functioning entirely as a video call.

If the system determines that no tiles exceed the preset threshold, then the system automatically determines that the entire screen is a screenshare. Determining that the whole screen is acting as a video call or a screenshare is often important when processing video, especially when automatically editing a video down into a compactified version, as described in U.S. Patent Publication No. 2020/0372066, which is incorporated herein by reference in its entirety. For example, in one embodiment, the system creates a compactified video and automatically edits out portions only containing video call elements, so as to focus on screenshare elements.

In one embodiment, after the system determines which tiles are screenshare tiles and which tiles are video tiles, the system constructs an expected layout model of the video, noting the relative position of these tiles. The system retains a memory of this layout model and uses it to effectively temporally smooth the data by automatically filtering out outliers frames from the expected layout. Absent a scene change, this allows the system to ignore, for example, instances in which the screenshare tile begins playing a video. For example, while the screenshare tile was originally detected by essentially determining that video was not actively playing, now that the screenshare tile has already been determined in the layout model, if it begins playing video, the system does not alter the layout model to improperly reclassify the screenshare tile as a video tile as no scene change has been detected. Furthermore, segmentation of individual tiles allows the system to detect when tiles have been moved. For example, if a video tile is in the bottom left in a first instant, but the tiles rearrange in a second instant such that the video tile is in the top right, the system is able to automatically recognize the new top right tile as the former bottom left tile based on a close similarity between the image shown in the top right tile in the second instant and the image shown in the bottom left tile in the first instant. This allows the system to quickly update the layout model between scene changes.

In one embodiment, the system automatically determines scene changes in a received video. A scene, according to the present invention, refers to a static configuration of screen elements (i.e., the relative juxtaposition of each tile on the screen). A scene change, therefore, refers to any change in the configuration of the screen elements, which commonly occurs (although not exclusively) when someone begins to share the screen, or stops sharing the screen.

Figure 3:
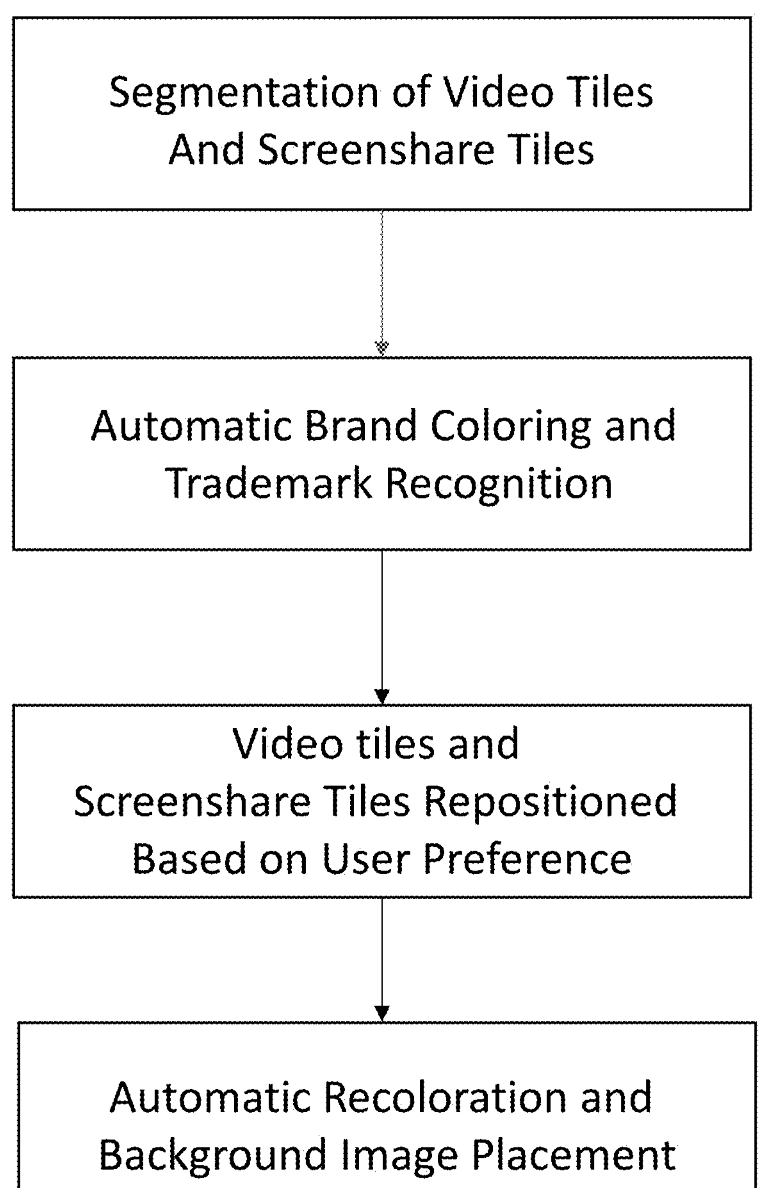
FIG. 3 is a flow diagram for improving the visual quality of a video according to one embodiment of the present invention.

FIG. 3 is a flow diagram for improving the visual quality of a video according to one embodiment of the present invention. After identification of each tile on the screen and segmentation of tiles into video tiles and screenshare tiles, the system is able to automatically reposition tiles and edit the recorded video to improve the aesthetic quality of the video.

In one embodiment, the system includes at least one web crawler. Based on information provided with the recorded video (e.g., client information), the system automatically informs the at least one web crawler of at least one company or individual associated with each recorded video. Based on the at least one associated company or individual, the at least one web crawler automatically crawls at least one search engine to identify brand information for the associated company or individual. By way of example and not limitation, the at least one web crawler identifies at least one brand logo, at least one text trademark, and/or at least one color associated with the at least one company or individual. In another embodiment, the system directly receives brand information, including at least one brand logo, at least one text trademark, and/or at least one color along with the recorded video and does not require the use of the at least one web crawler.

In one embodiment, the system automatically alters features of the recorded video to match the identified brand information for the at least one company or individual associated with the recorded video. By way of example and not limitation, in one embodiment, the system automatically recolors boundaries of tiles to match the at least one color associated with the at least one company or individual. In one embodiment, the system automatically overlays at least one watermark showing the company logo and/or a text trademark on a section of the recorded video. In one embodiment, the system automatically identifies portions of the recorded video other than the identified tiles, if any such space exists. In one embodiment, the system imposes the brand logo, another image associated with the company or individual, or one or more colors associated with the company or individual onto the background space, such that the images or colors do not block tiles of the video.

In one embodiment, the system receives a selected video format from at least one user device associated with the uploaded recorded videos. In one embodiment, the selected video format applies across each of the videos uploaded by the at least one user device. In one embodiment, the selected video format is specific for each video. The selected video format includes a designation of preferred relative tile positions for the duration of the video. In one embodiment, selecting the video format includes dragging or dropping tile elements onto a sample screen environment. The system is operable to automatically rearrange the tile positions to match the selected video format for each of the uploaded recorded videos. In one embodiment, if no video format is selected, a default video format is automatically applied to one or more of the uploaded recorded videos.

In one embodiment, the video or screenshare tiles are arranged on custom, branded backgrounds. The custom backgrounds are generated based on inputs such as, but not limited to, brand colors, brand icons, brand images. Special effects are applied to these brand parameters to add unique and aesthetically-pleasing animations or static displays on the background. The system is also capable of extracting components from the screenshare tile and transforming them to use as background artifacts. In one embodiment, the system uses words or phrases spoken by the speaker and fetches imagery corresponding to those words or phrases to use as background artifacts. If no brand parameters are provided, the system fetches and uses imagery based on the title and content of the video.

Figure 4:
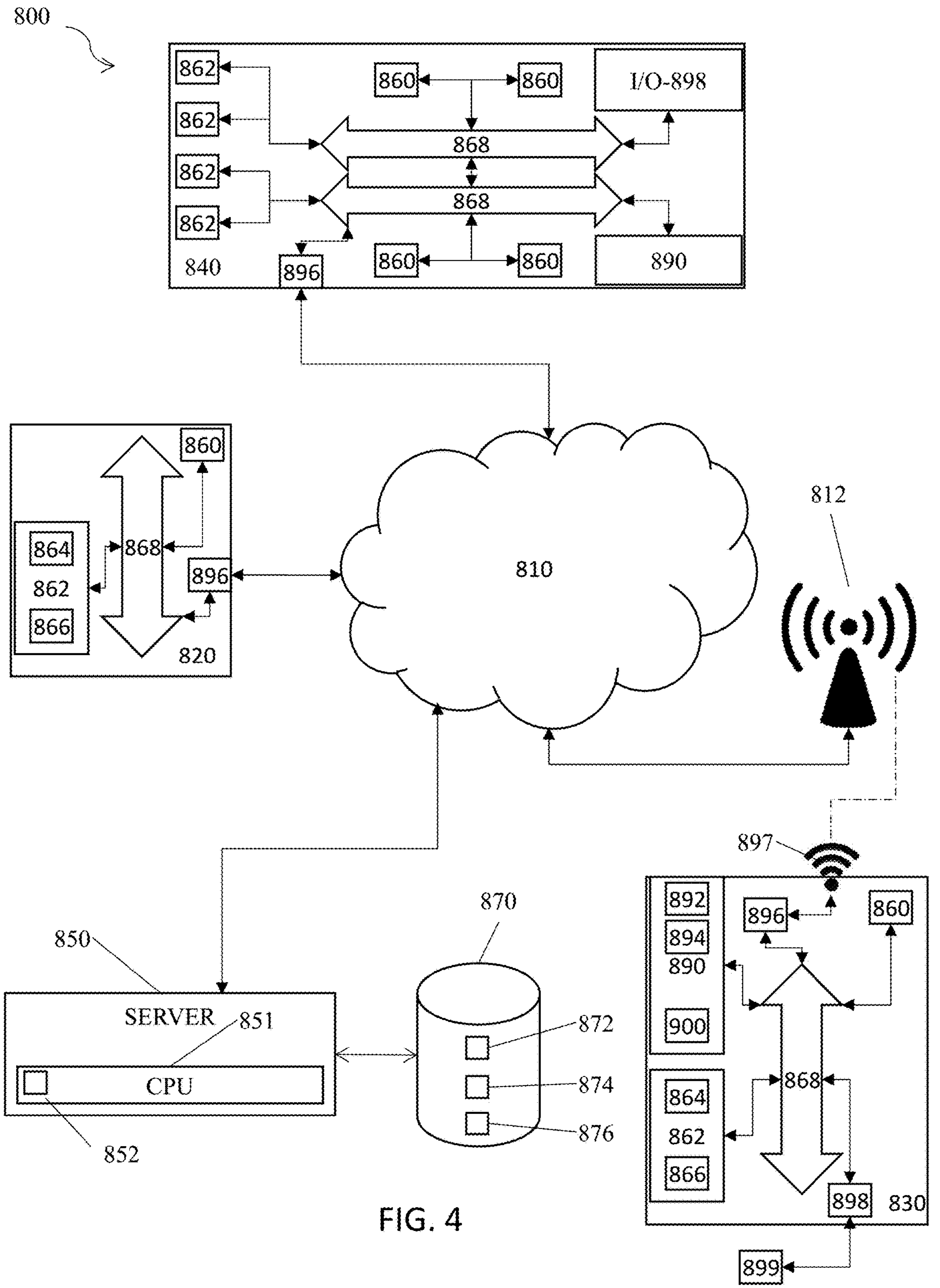
FIG. 4 is a schematic diagram of a system of the present invention.

FIG. 4 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 4, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 4, is operable to include other components that are not explicitly shown in FIG. 4, or is operable to utilize an architecture completely different than that shown in FIG. 4. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for improving the visual quality of screen recordings, comprising:

a server platform, including a processor and a memory;

wherein the server platform receives at least one screen recording;

wherein the server platform performs edge detection to automatically identify at least one tile constituting the at least one screen recording;

wherein the server platform performs liveness detection to determine if each of the at least one tile is a video tile or a screenshare tile; and wherein the server platform automatically reconfigures relative locations of each tile for one or more time points in the at least one screen recording based on whether each tile is a video tile or a screenshare tile.

2. The system of claim 1, wherein the at least one screen recording is a MP4, MOV, WMV, FLV, AVI, AVCHD, WebM, MKV, and/or OGV format prerecorded video.

3. The system of claim 1, wherein the server platform uses a Hough transform to perform the edge detection.

4. The system of claim 1, wherein the server platform receives information regarding at least one company and/or at least one individual associated with each screen recording, and wherein the server platform utilizes a web crawler to automatically retrieve brand information for the at least one associated company and/or the at least one associated individual.

5. The system of claim 4, wherein the server platform automatically recolors at least one section of the at least one screen recording based on the brand information of the at least one associated company and/or the at least one associated individual.

6. The system of claim 4, wherein the server platform automatically digitally overlays at least one logo to the at least one screen recording based on the brand information of the at least one associated company and/or the at least one associated individual.

7. The system of claim 1, wherein the reconfiguration of the relative locations of each tile is based on user preferences received from at least one user device.

8. The system of claim 1, wherein liveness detection includes determining if a number of changed pixels in a particular tile over a preset time period exceeds a preset threshold.

9. A method for improving the visual quality of screen recordings, comprising:

a server platform receiving at least one screen recording;

the server platform performing edge detection and automatically identifying at least one tile constituting the at least one screen recording;

the server platform performing liveness detection to determine if each of the at least one tile is a video tile or a screenshare tile; and the server platform automatically reconfiguring relative locations of each tile for one or more time points in the at least one screen recording based on whether each tile is a video tile or a screenshare tile.

10. The method of claim 9, wherein the at least one screen recording is a MP4, MOV, WMV, FLV, AVI, AVCHD, WebM, MKV, and/or OGV format prerecorded video.

11. The method of claim 9, further comprising the server platform utilizing a Hough transform to perform the edge detection.

12. The method of claim 9, further comprising the server platform receiving information regarding at least one company and/or at least one individual associated with each screen recording, and utilizing a web crawler to automatically retrieve brand information for the at least one associated company and/or the at least one associated individual.

13. The method of claim 12, further comprising the server platform automatically recoloring at least one section of the at least one screen recording based on the brand information of the at least one associated company and/or the at least one associated individual.

14. The method of claim 13, further comprising the server platform automatically digitally overlaying at least one logo to the at least one screen recording based on the brand information of the at least one associated company and/or the at least one associated individual.

15. The method of claim 9, wherein the reconfiguration of the relative locations of each tile is based on user preferences received from at least one user device.

16. The method of claim 9, wherein liveness detection includes determining if a number of changed pixels in a particular tile over a preset time period exceeds a preset threshold.

17. A system for improving the visual quality of screen recordings, comprising:

a server platform, including a processor and a memory;

wherein the server platform receives at least one screen recording;

wherein the server platform performs edge detection to automatically identify at least one tile constituting the at least one screen recording;

wherein the server platform performs liveness detection to determine if each of the at least one tile is a video tile or a screenshare tile;

wherein the server platform automatically reconfigures relative locations of each tile for one or more time points in the at least one screen recording based on whether each tile is a video tile or a screenshare tile;

wherein the server platform receives information regarding at least one company and/or at least one individual associated with each screen recording, and wherein the server platform utilizes a web crawler to automatically retrieve brand information for the at least one associated company and/or the at least one associated individual; and herein the server platform automatically recolors at least one section of the at least one screen recording based on the brand information of the at least one associated company and/or the at least one associated individual.

18. The system of claim 17, wherein the server platform automatically digitally overlays at least one logo to the at least one screen recording based on the brand information of the at least one associated company and/or the at least one associated individual.

19. The system of claim 17, wherein the reconfiguration of the relative locations of each tile is based on user preferences received from at least one user device.

20. The system of claim 17, wherein the at least one screen recording is a MP4, MOV, WMV, FLV, AVI, AVCHD, WebM, MKV, and/or OGV format prerecorded video.

* * * * *